UNITED STATES PATENT OFFICE.

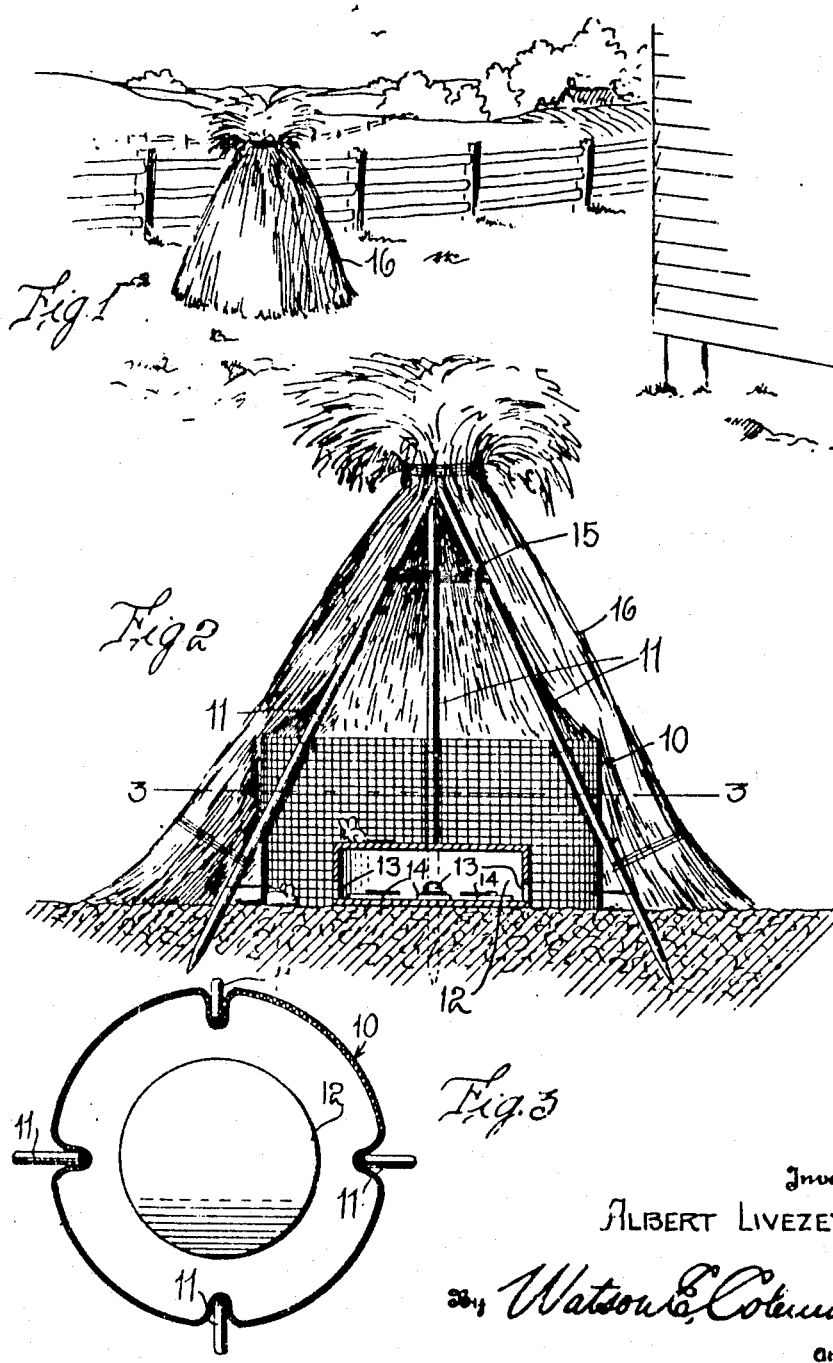
LIVEZEY.
FORD, GUARDIAN.
TRAP.
APPLICATION FILED AUG. 11, 1917.
1,259,641. Patented Mar. 19, 1918.
Inventor
ALBERT LIVEZEY
By Watson E. Coleman
Attorney

ALBERT LIVEZEY, OF GRINNELL, IOWA; JOHN FORD, GUARDIAN OF SAID ALBERT LIVEZEY.

TRAP.

1,259,641.  Specification of Letters Patent.  Patented Mar. 19, 1918.

Application filed August 11, 1917. Serial No. 185,769.

*To all whom it may concern:*

Be it known that ALBERT LIVEZEY, a citizen of the United States, residing at Grinnell, in the county of Poweshiek and State of Iowa, has invented certain new and useful Improvements in Traps, of which the following is a specification, reference being had to the accompanying drawings.

This invention relates to traps for catching rats, mice and other rodents, and particularly to devices for trapping field mice and like animals, which frequent shocks in the field and grain stacks.

The general object of the invention is to provide means for concealing a plurality of traps, this means simulating a grain shock so as to particularly attract field mice and like animals.

A further object is to provide very simple means which may be used for supporting the straw and used as a skeleton frame upon which the straw or other attractive material may be disposed.

Other objects will appear in the course of the following description.

My invention is illustrated in the accompanying drawings, wherein:—

Figure 1 is a perspective view of my imitation straw shock;

Fig. 2 is a vertical sectional view through the imitation shock showing the traps mounted therein; and Fig. 3 is a section on the line 3—3 of Fig. 2.

Referring to these drawings, it will be seen that my improved trapping device comprises an approximately cylindrical body 10 formed of wire netting of relatively large mesh and a plurality of stakes 11 disposed in an upwardly convergent relation and attached to the body 10, these stakes being held together by a string, wire or any other suitable device to this end. Within the body 10 is preferably disposed a box 12 having a plurality of entrance openings 13 and within the box are disposed a plurality of traps 14, which may be of any suitable character, but preferably are the ordinary mouse traps found on the market. Corn, bran, cheese, apple parings, or any other bait is designed to be scattered in the vicinity of the imitation straw shock and in paths leading into the interior of the body 10 and leading through the entrance openings 13, so that the mice will be attracted into the shock and then be caught in the traps.

In the actual construction of this device, I take a strip of wire netting, preferably about 5 feet long and 1 foot high and bend this strip into a circle fastening the ends of the strip together and thus forming the body 10. I then take a plurality of stakes 11 which are about 2½ feet high and drive them into the ground so that they are in a more or less convergent relation. The stakes are held in this convergent relation by cord or wire 15, which is wrapped around the stakes and also acts to fasten the body to the stakes. Straw, or other like material, designated 16, is then disposed upon the frame work thus formed, this straw extending upward in the manner that straw extends in a grain shock. The straw may be fastened to the skeleton frame by cord or other fastening means, so that the entire imitation shock may be lifted up and transported from one portion of a field to another, the stakes being again driven into the ground a slight distance when the trap is replaced.

I have found by experience that the imitation grain shock forms a particularly effective means for concealing trapping devices, because it not only conceals the trapping devices, but it is in itself an attraction, as field mice and other animals which do great damage to standing and harvested crops frequent these shocks of grain in the open field to a very great extent.

Of course it may be necessary to bait the imitation shock before placing the traps therein. Thus it may be baited for several days or nights until the mice or other animals become used to the shock and to the supply of food to be found within it. Then the traps can be placed within the imitation shock or within the box 12 and the number of animals caught after a procedure of this kind is relatively large. The device is simple, may be cheaply made, is easily applied and, as before stated, is thoroughly effective and may be even used in side houses for the purpose of catching mice and rats.

Having described my invention, what I claim is:—

1. A device of the character described comprising a body formed of wire netting, stakes attached to the body and extending upward in convergent relation and extending downward below the body, and straw extending upward and attached to the stakes and the body to simulate a grain shock.

2. A device of the character described comprising a plurality of convergent stakes having pointed lower ends and connected to each other at their upper ends, an approximately cylindrical body formed of wire netting, the body being folded inward at a plurality of points to receive said upwardly convergent stakes and being attached to the stakes, and a covering of straw attached to the body and extending downward along the stakes and extending upward above the stakes and then outwardly spread to simulate a grain shock.

In testimony whereof I hereunto affix my signature in the presence of two witnesses.

ALBERT LIVEZEY.

Witnesses:
JOHN FLEENER,
EDGAR MCNEIL.

Copies of this patent may be obtained for five cents each, by addressing the "Commissioner of Patents, Washington, D. C."